(12) United States Patent
Kano

(10) Patent No.: US 8,045,589 B2
(45) Date of Patent: Oct. 25, 2011

(54) RADIO COMMUNICATION SYSTEM WITH DATA STRUCTURE CHANGE

(75) Inventor: Jun Kano, Yokohama (JP)

(73) Assignee: Kyocera Corporation, Kyoto (JP)

( * ) Notice: Subject to any disclaimer, the term of this patent is extended or adjusted under 35 U.S.C. 154(b) by 722 days.

(21) Appl. No.: 12/110,039

(22) Filed: Apr. 25, 2008

(65) Prior Publication Data

US 2008/0310339 A1  Dec. 18, 2008

Related U.S. Application Data

(60) Provisional application No. 60/914,248, filed on Apr. 26, 2007.

(51) Int. Cl.
*H04J 3/18* (2006.01)

(52) U.S. Cl. ............. 370/477; 370/310.2; 370/328; 370/349; 370/468; 370/474; 370/475; 455/422.1; 379/88.1; 379/93.08; 709/247

(58) Field of Classification Search ........... 370/310.2, 370/328, 329–339, 349, 468, 474–477; 455/422.1; 379/88.1, 93.08; 709/247
See application file for complete search history.

(56) References Cited

U.S. PATENT DOCUMENTS

| | | | |
|---|---|---|---|
| 2,735,525 A | 2/1956 | Martindell | |
| 2,914,158 A | 11/1959 | Zeidler et al. | |
| 6,438,123 B1 * | 8/2002 | Chapman | 370/351 |
| 2001/0048680 A1 * | 12/2001 | Yoshimura et al. | 370/389 |
| 2005/0271066 A1 * | 12/2005 | Valadarsky | 370/401 |
| 2006/0067278 A1 * | 3/2006 | Li et al. | 370/335 |
| 2006/0088051 A1 * | 4/2006 | Mulligan | 370/466 |

* cited by examiner

*Primary Examiner* — Aung S Moe
*Assistant Examiner* — Hoon J Chung
(74) *Attorney, Agent, or Firm* — DLA Piper LLP (US)

(57) ABSTRACT

Provided is a radio communication method including: notifying a reception-side radio communication apparatus of omitted-source-address information indicating a first source address permanently assigned to a source device of a first data frame to be transmitted to the reception-side radio communication apparatus; determining whether or not the first source address is identical to a second source address permanently assigned to a source device of a second data frame to be transmitted to the reception-side radio communication apparatus; and transmitting the second data frame to the reception-side radio communication apparatus after omitting transmission of the second source address and also adding, to the second data frame, an omission indication indicating that the second source address is omitted, if the first source address is determined to be identical to the second source address.

9 Claims, 12 Drawing Sheets

Ethernet II

IEEE802.3 Raw

IEEE802.2 LLC

IEEE802.2 SNAP

FIG. 6

LLC COMPRESSED HEADER

| FIELD | FORMAT |
|---|---|
| FLAG | • STRUCTURE OF FLAG INDICATING WHETHER OR NOT THERE IS FOLLOWING FIELD<br>• 1 OCTET |
| DESTINATION MAC ADDRESS | • DESTINATION MAC ADDRESS FIELD IN DATA LINK HEADER<br>• 6 OCTETS |
| SOURCE MAC ADDRESS | • SOURCE MAC ADDRESS FIELD IN DATA LINK HEADER<br>• 6 OCTETS |
| DSAP/SSAP | • DSAP FIELD AND SSAP FIELD IN LLC HEADER<br>• 2 OCTETS |
| CTRL | • CTRL FIELD IN LLC HEADER<br>• 1 OCTET |
| TYPE | • TYPE FIELD IN DATA LINK HEADER OR TYPE FIELD IN SNAP HEADER<br>• 2 OCTETS |
| TOTAL | VARIABLE OCTETS |

FIG. 7

FLAG FIELD

| msb | | | bits | | | | lsb |
|---|---|---|---|---|---|---|---|
| 8 | 7 | 6 | 5 | 4 | 3 | 2 | 1 |
| MSG 0 | BC | FADMA | FASMA | RAW | SNAP | TYPE | RES 0 |

FIG. 8

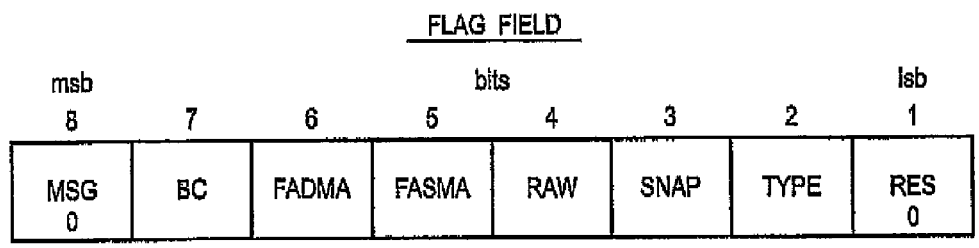

| FLAG PATTERN | | | DATA FRAME FORMAT | FIELD INCLUDED OR NOT INCLUDED | | |
|---|---|---|---|---|---|---|
| RAW | SNAP | TYPE | | DSAP/SSAP | CTRL | TYPE |
| 0 | 0 | 0 | IEEE 802.2 LLC | INCLUDED | INCLUDED | INCLUDED |
| 0 | 0 | 1 | Ethernet II | NOT INCLUDED | NOT INCLUDED | INCLUDED |
| 0 | 1 | 0 | IEEE 802.2 SNAP(TYPE=IP) | NOT INCLUDED | NOT INCLUDED | NOT INCLUDED |
| 0 | 1 | 1 | IEEE 802.2 SNAP | NOT INCLUDED | NOT INCLUDED | INCLUDED |
| 1 | 0 | 0 | IEEE 802.3 Raw | NOT INCLUDED | NOT INCLUDED | NOT INCLUDED |
| 1 | 0 | 1 | COMBINATIONS NOT ALLOWED | — | — | — |
| 1 | 1 | 0 | | — | — | — |
| 1 | 1 | 1 | | — | — | — |

FIG. 10

PRIMITIVE MESSAGE

| msb 8 | 7 | 6 | bits 5 | 6 | 3 | 2 | lsb 1 | Octet |
|---|---|---|---|---|---|---|---|---|
| 1 MSG | 0 | 0 | 0 | 0 | 0 | 0 | 1 | 0 |
| | | | | | | | | |
| 0 | MESSAGE ID | | | | | | | |
| 0 | MESSAGE LENGTH (assuming < 128 bytes) | | | | | | | 1 |
| FREQUENTLY-APPEARING SOURCE MAC ADDRESS | | | | | | | | 2 |
| FREQUENTLY-APPEARING SOURCE MAC ADDRESS | | | | | | | | 3 |
| FREQUENTLY-APPEARING SOURCE MAC ADDRESS | | | | | | | | 4 |
| FREQUENTLY-APPEARING SOURCE MAC ADDRESS | | | | | | | | 5 |
| FREQUENTLY-APPEARING SOURCE MAC ADDRESS | | | | | | | | 6 |
| FREQUENTLY-APPEARING SOURCE MAC ADDRESS | | | | | | | | 7 |

EXTENSION

RADIO COMMUNICATION SYSTEM WITH DATA STRUCTURE CHANGE

BACKGROUND OF THE INVENTION

1. Field of the Invention

The present invention relates to a radio communication system, a radio communication apparatus, and a radio communication method that are capable of reducing the proportion of the overhead of a data frame.

2. Description of the Related Art

In a conventional radio communication system such as a wireless LAN (for example, IEEE 802.11), a tradeoff relationship is generally established between communication reception quality of a radio signal and possible transmission rate. Accordingly, such a radio communication system has a problem that, as the communication reception quality of a radio signal is deteriorated, transmission efficiency decreases more significantly than in the case of a cable communication system.

Specifically, in such a radio communication system, there is a problem that the proportion of a header, that is, the proportion of the overhead, becomes large in a data frame, when the transmission rate decreases with the deterioration of communication reception quality. Here, the data frame consists of payload used for transmitting and receiving user data, and the header including control information and the source and destination addresses.

In view of the above problem, a method of omitting transmission of information included in the header has been proposed (for example, in Japanese Patent Application Publication No. 2004-48115 (p. 11 and FIG. 4 of the patent document)) as means for reducing the proportion of the overhead of a data frame. Specifically, control information (such as information on communication parameter setting) included in a header is transmitted once in every predetermined number of (for example, three) data frames, instead of every single data frame. By means of this transmission method, it is possible to decrease information amount to be transmitted by using headers, and thereby to decrease the proportion of the overhead.

In recent years, along with development in radio communication technology, transmission rate, that is, channel capacity, in radio communication systems has been increasing. A widely known scheme for such a recent radio communication system is "High Capacity-Spatial Division Multiple Access (HC-SDMA) WTSC-2005-032 (ATIS/ANSI)," and iBurst (registered trademark) is provided as a radio communication system conforming to this scheme.

In addition, the increase in transmission rate has led to an ongoing discussion of the use of IEEE 802.2 LLC or the combination of IEEE 802.2 LLC and IEEE 802.3 (Ethernet, registered trademark), which are de facto standards in cable communication systems, as an upper layer protocol of the radio communication system.

However, even in the radio communication system, which is capable of providing high transmission rate, transmission rate decreases if the communication reception quality of a radio signal is deteriorated. Moreover, the proportion of the overhead in a data frame further increases in the case of using the above standards, IEEE 802.2 LLC and IEEE 802.3, as an upper layer protocol of the radio communication system.

To solve these problems, it is conceivable to use the above-described method of omitting transmission of information included in a header, for example. However, the method achieves only the reduction in the number of transmissions of control information (such as information on communication parameter setting). Hence, the method has a problem that it is not possible to omit transmission of the source and destination addresses, specifically, the MAC address (total 12 bytes) defined by IEEE 802.3 and the like, of a data frame.

SUMMARY OF THE INVENTION

The present invention has been made in the light of the above-described circumstances. An object of the present invention is to provide a radio communication system, a radio communication apparatus and a radio communication method that are capable of omitting transmission of headers including the source and destination addresses and the like.

To solve the above-described problems, the present invention includes the following aspects. Firstly, a first aspect of the present invention provides a radio communication system including a transmission-side radio communication apparatus (for example, a radio communication terminal 100) and a reception-side radio communication apparatus (for example, a radio base station 200) configured to perform radio communication with the transmission-side radio communication apparatus. The transmission-side radio communication apparatus includes a relay unit (a relay unit 103), an address detector (a MAC address processor 104), a source address information notification unit (a MAC address notification unit 105), a determination unit (a MAC address determination unit 107), and a data structure change unit (a data frame processor 108). The relay unit receives a first data frame to be transmitted to the reception-side radio communication apparatus, and then relays the first data frame to the reception-side radio communication apparatus. The address detector detects a first source address (a frequently-appearing source MAC address), which is included in the first data frame received by the relay unit, and which is permanently assigned to a source device (for example, a client PC 300) of the first data frame. The source address information notification unit notifies the reception-side radio communication, apparatus of omitted-source-address information (a primitive message) indicating the first source address detected by the address detector. The determination unit determines whether or not the first source address, of which the source address information notification unit notifies the reception-side radio communication apparatus, is identical to a second source address included in a second data frame received by the relay unit, and permanently assigned to the source device (for example, the client PC 300) of the second data frame. The data structure change unit changes the structure of the second data frame, if the determination unit determines that the first source address is identical to the second source address. Here, the data structure change unit omits transmission of the second source address included in the second data frame, and also adds, to the second data frame, an omission indication (FASMA flag=1) indicating that the second source address is omitted. The reception-side radio communication apparatus includes a receiver (a radio processor 201 and a relay unit 203) and a device identification unit (a MAC address processor 204). The receiver receives the first data frame, the omitted-source-address information and the second data frame from the transmission-side radio communication apparatus. The device identification unit identifies the source device (for example, the client PC 300) of the second data frame on the basis of the omitted-source-address information received by the receiver, if the omission indication is added to the second data frame received by the receiver.

According to the first aspect, the transmission-side radio notification apparatus notifies the reception-side radio communication apparatus of the omitted-source-address information, which is included in the first data frame, and which indicates the first source address permanently assigned to the source device of the first data frame. Moreover, the transmission-side radio communication apparatus omits transmission of the second source address, and also adds, to the second data frame, omission indication indicating that the second source address is omitted, if the first source address is identical to the second source address included in the second data frame, and permanently assigned to the source device of the second data frame.

Here, the "the first source address permanently assigned to the source device of the first data frame" and the "second source address permanently assigned to the source device of the second data frame" each mean the MAC address of the corresponding source device, for example. The MAC address may be either a type that is not updated after being assigned to the source device or a type that is updated after predetermined time.

The receiving-side communication apparatus identifies the source device of the second data frame on the basis of the received omitted-source-address information, if the omission identification is added to the received second data frame. Accordingly, the transmission-side radio communication apparatus can omit transmission of the source address.

A second aspect of the present invention provides a radio communication apparatus that performs radio communication with a reception-side radio communication apparatus. The radio communication apparatus includes a relay unit, an address detector, a source address information notification unit, a determination unit, and a data structure change unit. The relay unit receives a first data frame to be transmitted to the reception-side radio communication apparatus, and then relays the first data frame to the reception-side radio communication apparatus. The address detector detects a first source address, which is included in the first data frame received by the relay unit, and which is permanently assigned to the source device of the first data frame. The source address information notification unit notifies the reception-side radio communication apparatus of omitted-source-address information indicating the first source address detected by the address detector. The determination unit determines whether or not the first source address, of which the source address information notification unit notifies the reception-side radio communication apparatus, is identical to a second source address included in a second data frame received by the relay unit, and permanently assigned to a source device of the second data frame. The data structure change unit changes the structure of the second data frame, if the determination unit determines that the first source address is identical to the second source address. Here, the data structure change unit omits transmission of the second source address included in the second data frame, and also adds, to the second data frame, an omission indication indicating that the second source address is omitted.

A third aspect of the present invention according to the second aspect of the present invention is that the radio communication apparatus further includes an address information receiver (the MAC address processor 104), which receives, from the reception-side radio communication apparatus, omitted-destination-address information (a primitive message) indicating a destination address assigned to a certain destination device (for example, a gateway 500). Here, the second data frame includes a destination address (a frequently-appearing destination MAC address) permanently assigned to a destination device (for example, the gateway 500) of the second data frame. In addition, the data structure change unit omits transmission of the destination address, in addition to the second source address, on the basis of the omitted-destination-address information received by the address information receiver.

Here, the "destination address permanently assigned to the destination device of the second data frame" may be either a type that is not updated after being assigned to the source device or a type that is updated after predetermined time.

A fourth aspect of the present invention according to the second aspect of the present invention is that the determination unit determines whether or not the second data frame is to be broadcast to a plurality of destination devices. In addition, if the determination unit determines that the second data frame is broadcast to a plurality of destination devices, the data structure change unit omits transmission of a destination address which is included in the second data frame, and which is indicating broadcast.

A fifth aspect of the present invention according to the second aspect of the present invention is that the data structure change unit transmits user data addressed to a destination device of the second data frame, instead of transmitting the second source address.

A sixth aspect of the present invention according to the third aspect of the present invention is that the data structure change unit transmits user data addressed to a destination device of the second data frame, instead of transmitting the destination address.

A seventh aspect of the present invention according to the second aspect of the present invention is that the source address information unit transmits, as the omitted-source-address information, to the reception-side radio communication apparatus, the first source address that is detected, by the address detector, the number of times that is larger than a predetermined threshold value.

An eighth aspect of the present invention provides a radio communication apparatus that performs radio communication with a transmission-side radio communication apparatus. The radio communication apparatus includes a receiver and a device identification unit. The receiver receives a first data frame, omitted-source-address information and a second data frame from the transmission-side radio communication apparatus. The device identification unit identifies a source device of the second data frame on the basis of the omitted-source-address information received by the receiver, if an omission indication is added to the second data frame received by the receiver. Here, the first data frame and the second data frame are relayed by the transmission-side radio-communication apparatus. Moreover, the omitted-source-address information indicates a first source address, which is permanently assigned to a source device of the first data frame. Furthermore, the first source address is included in the first data frame. In addition, the omission indication is included in the second data frame, and indicates that a second source address permanently assigned to the source device of the second data frame is omitted.

A ninth aspect of the present invention according to the eighth aspect of the present invention is that the radio communication apparatus further includes a destination address information notification unit, which notifies the transmission-side radio communication apparatus of omitted-destination-address information indicating a destination address assigned to a certain destination device. Here, the second data frame includes a destination address permanently assigned to the destination device of the second data frame.

A tenth aspect of the present invention provides a radio communication method using a transmission-side radio communication apparatus and a reception-side radio communication apparatus, which performs radio communication with the transmission-side radio communication apparatus. The radio communication method includes the steps of: notifying, at the transmission-side radio communication apparatus, the reception-side radio communication apparatus of omitted-source-address information indicating a first source address permanently assigned to the source device of a first data frame to be transmitted to the reception-side radio communication apparatus (Step S102); determining, at the transmission-side radio communication apparatus, whether or not the first source address is identical to a second source address permanently assigned to a source device of a second data frame to be transmitted to the reception-side radio communication apparatus (Step S207); transmitting, at the transmission-side radio communication apparatus, the second data frame to the reception-side radio communication apparatus after omitting transmission of the second source address included in the second data frame and also adding, to the second data frame, an omission indication indicating that the second source address is omitted, if the first source address is determined to be identical to the second source address in the step of determining (Step S104); receiving, at the reception-side radio communication apparatus, the first data frame, the omitted-source-address information and the second data frame from the transmission-side radio communication apparatus (Step S301); and identifying, at the reception-side radio communication apparatus, the source device of the second data frame on the basis of the received omitted-source-address information, if the omission indication is added to the second data frame received in the step of receiving (Step S308).

An eleventh aspect of the present invention provides a radio communication system including a transmission-side radio communication apparatus and a reception-side radio communication apparatus, which performs radio communication with the transmission-side radio communication apparatus. The transmission-side radio communication apparatus includes a data frame obtaining unit, a format determination unit, an omitted field identification unit, and a transmitter. The data frame obtaining unit obtains a data frame consisting of a plurality of fields. The format determination unit determines the format of the data frame obtained by the data frame obtaining unit. The omitted field identification unit identifies a field as an omitted fields transmission of which to the reception-side radio communication apparatus is to be omitted, on the basis of the format determined by the format determination unit, the field being included in the data frame, and storing therein a predetermined value. The transmitter transmits, to the reception-side radio communication apparatus, indication information indicating the format determined by the format determination unit and the omitted field identified by the omitted field identification unit, and fields other than the omitted field. Moreover, the reception-side radio communication apparatus includes a receiver, a format complementation unit, and a data frame reconstruction unit. The receiver receives the indication information and the fields transmitted by the transmission-side radio communication apparatus. The format complementation unit determines the format of the data frame and the omitted field on the basis of the indication information received by the receiver, and complements the predetermined value stored in the omitted field. The data frame reconstruction unit reconstructs the data frame by using the fields received by the receiver and the omitted field complemented by the format complementation unit.

A twelfth aspect of the present invention according to the eleventh aspect of the present invention is that the indication information consists of a combination of a plurality of flags.

A thirteenth aspect of the present invention according to the eleventh aspect of the present invention is that the omitted field identification unit identifies, as the omitted field, an error detection field that is included in the data frame, and that stores therein error detection information calculated by using a predetermined algorithm. The data frame reconstruction unit calculates the error detection information by using the predetermined algorithm, and stores the calculated error detection information in the error detection field in the data frame to be reconstructed.

BRIEF DESCRIPTION OF THE DRAWINGS

FIG. 6 is a diagram showing a configuration of an LLC compressed header used in the radio communication system according to the embodiment of the present invention.

FIG. 7 is a diagram showing a configuration of a flag field included in the LLC compressed header shown in FIG. 6, FIG. 8 is a table showing relationships between flag patterns and data frame formats used in the radio communication system according to the embodiment of the present invention.

FIG. 10 is a diagram showing a configuration of a primitive message used in the operation for exchanging frequently-appearing MAC addresses shown in FIG. 9.

DESCRIPTION OF THE PREFERRED EMBODIMENT

Figure 1:
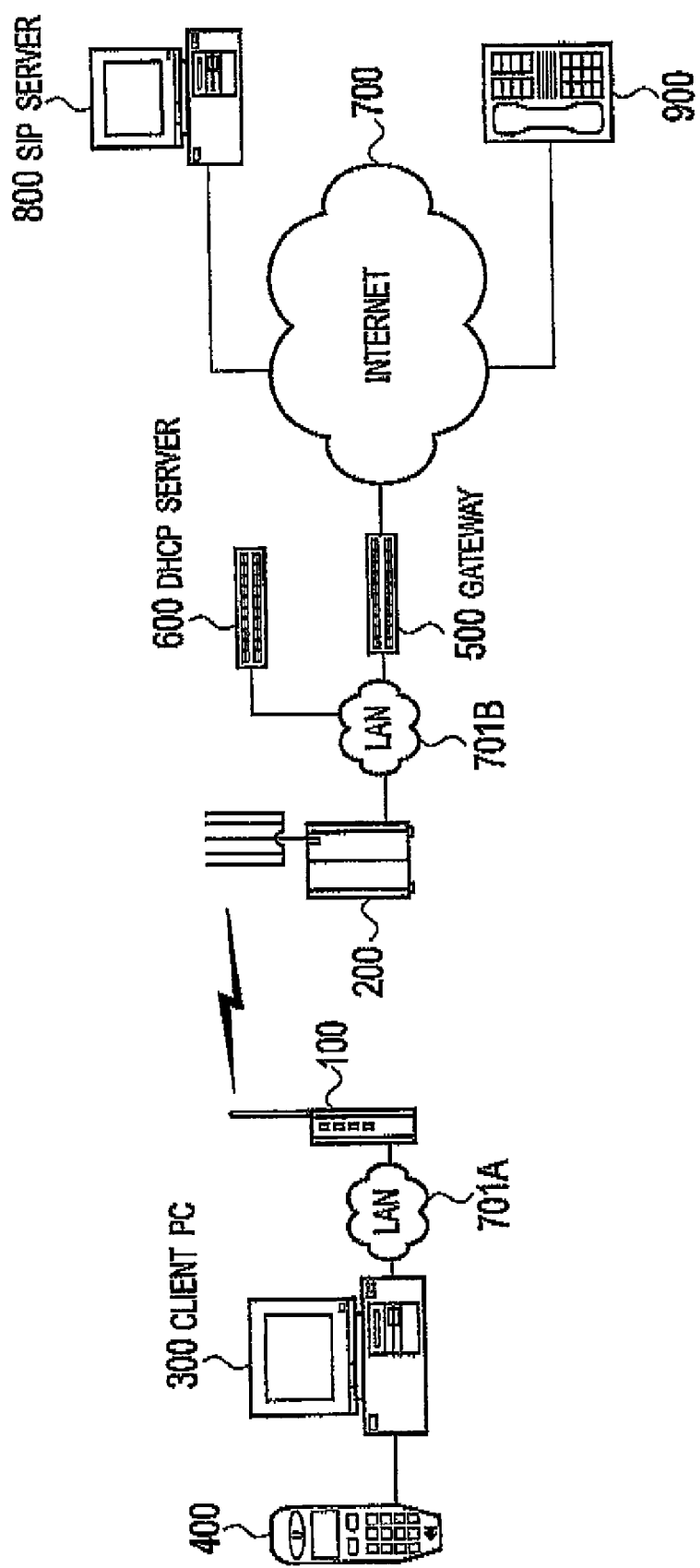
FIG. 1 is a schematic configuration diagram of a radio communication system according to an embodiment of the present invention.

Hereinbelow, description will be given of an embodiment of the present invention. In the following description of the drawings, the same or similar reference numerals are given to the same or similar constituents.

The following description of this embodiment is organized by describing (1) overall schematic configuration, (2) detailed configuration of radio communication system, (3) data frame configurations, (4) configuration of LLC compressed header, (5) configuration of flag field, (6) operation of radio communication system, (7) comparative example, and (8) effects and advantages, in this order.

(1) Overall Schematic Configuration

Firstly, the overall schematic configuration of a radio communication system according to this embodiment will be described on the basis of (1.1) configuration of radio communication system and (1.2) protocol stack in this order. The radio communication system to be described in this embodiment is a radio communication system used for VoIP (Voice over Internet Protocol).

(1.1) Configuration of Radio Communication System

FIG. 1 is a schematic configuration diagram of the radio communication system according to this embodiment. As shown in FIG. 1, the radio communication system according to this embodiment includes a radio communication terminal 100, a radio base station 200, a client PC 300, a user interface device 400, a gateway 500, a DHCP server 600, the Internet 700, a SIP (Session Initiation Protocol) server 800, and a SIP telephone 900.

In this embodiment, radio communication between the radio communication terminal 100 and the radio base station 200 is performed according to iburst. The radio communication terminal 100 is connected to the client PC 300 via a local area network (LAN) 701A based on IEEE 802.3/Ethernet. The radio base station 200 performs radio communication with the radio communication terminal 100. The radio base station 200 is connected to the DHCP server 600 and the gateway 500 via a LAN 701B.

The radio communication terminal 100 relays, to the radio base station 200, a data frame (IEEE 802.3/Ethernet packet) transmitted from the client PC 300 and the radio base station 200 relays, to the gateway 500, the data frame transmitted from the radio communication terminal 100.

Moreover, the radio base station 200 relays, to the radio communication terminal 100, a data frame transmitted from the gateway 500. The radio communication terminal 100 relays, to the client PC 300, the data frames transmitted from the radio base station 200.

In this manner, the radio communication terminal 100 and the radio base station 200 enable wireless communication in part of the LAN based on IEEE 802.3/Ethernet. This means that the LAN 701A on the radio communication terminal 100 side and the LAN 701B on the radio base station 200 side, function together as a single LAN.

The client PC 300 is provided with a voice communication application using a SIP (such as RFC3261). The user interface device 400 includes a microphone, a speaker, a keypad and the like, to function as an interface between the user and the voice communication application.

The DHCP server 600 communicates with the client PC 300 via the radio communication terminal 100 and the radio base station 200, and assigns a local IP address to the client PC 300.

The gateway 500 performs two-way conversion between global IP addresses and local IP addresses, by using a NAT (Network Address Translation) table. The gateway 500 mediates between the LAN 701B and the Internet 700.

The client PC 300 communicates with individual devices on the Internet 700 via the gateway 500. The SIP server 800 performs call control for the SIP telephone 900 and the client PC 300 according to the SIP. With this configuration, the client PC 300 and the SIP telephone 900 can perform voice communication using VoIP.

(1.2) Protocol Stack

Figure 2:
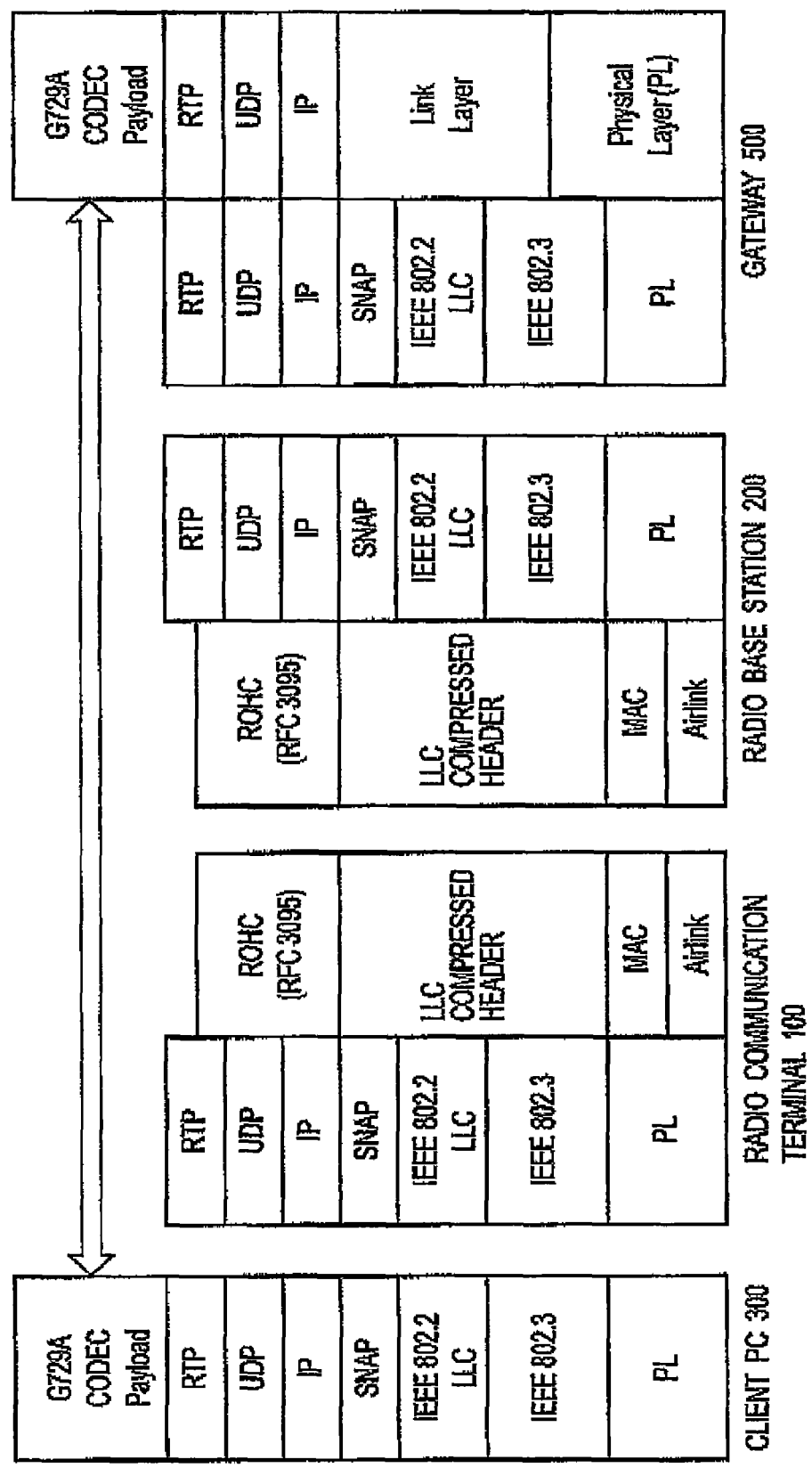
FIG. 2 is a diagram showing a protocol stack of the radio communication system according to the embodiment of the present invention.

FIG. 2 is a diagram showing a protocol stack of the radio communication system according to this embodiment. As shown in FIG. 2, the radio communication terminal 100 and the radio base station 200 each implements ROHC (RObust Header Compression).

ROHC compresses a total of 40 bytes of a RTP/UDP/IP packet header down to 2 bytes. In voice communication using VoIP, two G729A (8 Kbps) codec packets are stored in a single RTP/UDP/IP packet.

In this embodiment, the proportion of the overhead of each data frame that the radio communication terminal 100 and the radio base station 200 transmit to and receive from each other is reduced by using an LLC compressed header. Specifically, the radio communication terminal 100 and the radio base station 200 each omit the source MAC address and the destination MAC address of a data frame.

After establishing a radio connection, the radio communication terminal 100 and the radio base station 200 exchange frequently-appearing source MAC addresses prior to transfer of user data. Here, the "frequently-appearing source MAC addresses" are source MAC addresses that are each expected to frequently appear as a source MAC address in a data link header. As a frequently-appearing source address, the MAC address of the device creating the data frame that is a trigger for the establishment of the radio communication is preferably selected.

In a state where the client PC 300 and the SIP telephone 900 perform voice communication using VoIP, the data link header of a data frame transmitted from the radio communication terminal 100 to the radio base station 200 is expected to include the MAC address of the client PC 300 as its source and the MAC address of the gateway 500 as its destination.

By contrast, the data link header of a data frame transmitted from the radio base station 200 to the radio communication terminal 100 is expected to include the MAC address of the gateway 500 as its source and the MAC address of the client PC 300 as its destination.

Accordingly, the frequently-appearing source address in the radio communication terminal 100 is the MAC address of the client PC 300, and the frequently-appearing source address in the radio base station 200 is the MAC address of the gateway 500.

However, it is also expected that the radio communication terminal 100 and the radio base station 200 exchange ARP (Address Resolution Protocol) packets for a regular or irregular update of the ARP tables. In such a case, the destination and the source of each packet are not necessarily the frequently-appearing source MAC addresses. Nevertheless, such ARP packet transmission is not a major factor in reducing the throughput, since ARP packet transmission is less frequent than codec packet transmission in voice communication using VoIP.

(2) Detailed Configuration of Radio Communication System

Next, description will be given to (2.1) configuration of radio communication terminal 100 and (2.2) configuration of radio base station 200.

(2.1) Configuration of Radio Communication Terminal

Figure 3:
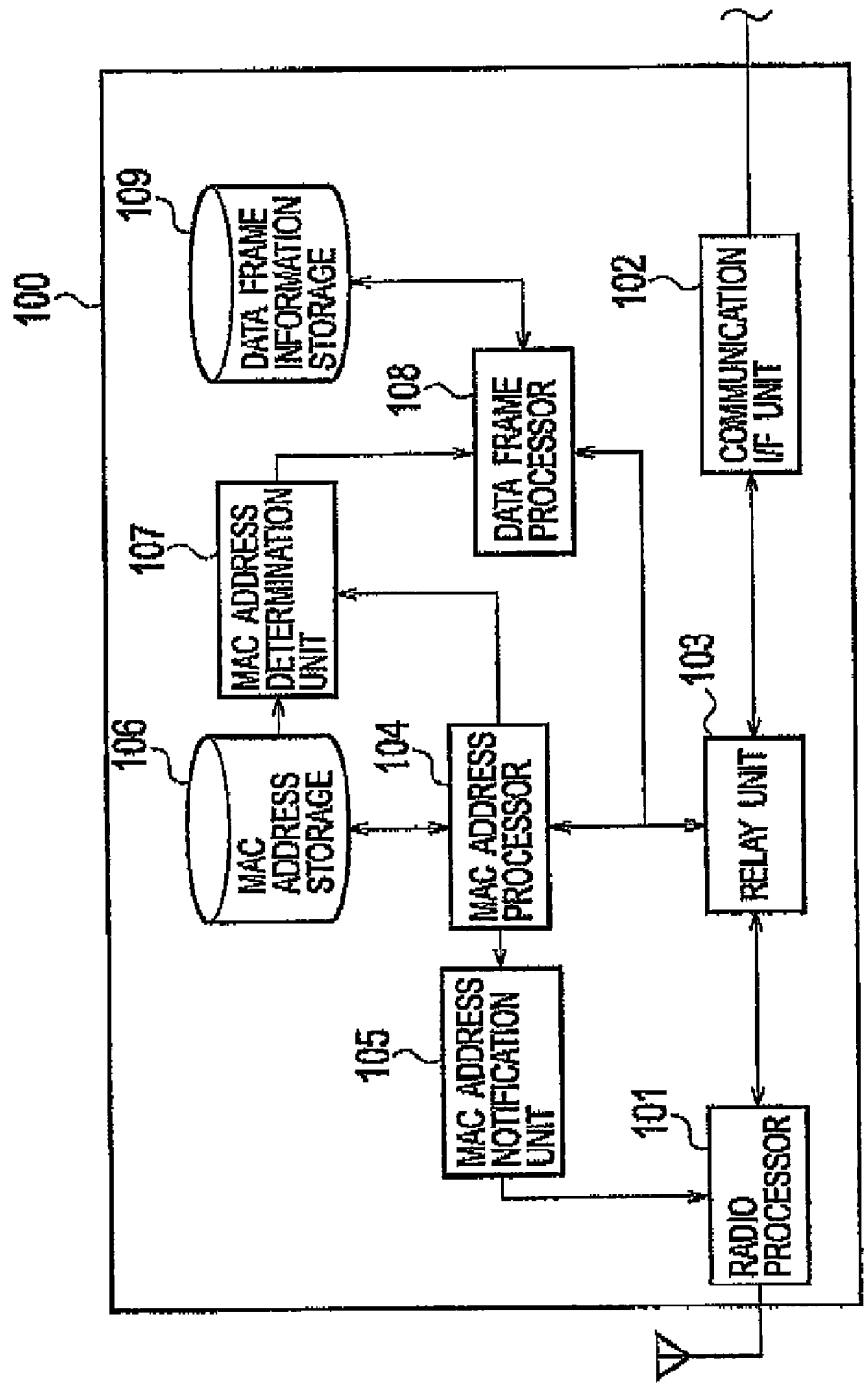
FIG. 3 is a functional block diagram of a radio communication terminal according to the embodiment of the present invention.

FIG. 3 is a functional block diagram of the radio communication terminal 100. In the following, description will mainly be given to the constituents that are related to the present invention. Hence, it should be noted that the radio communication terminal 100 includes logical blocks (such as a power source unit) essential to implementing functions as a radio communication terminal, which is not illustrated in FIG. 3, or the description of which is omitted here, in some cases.

As shown in FIG. 3, the radio communication terminal 100 includes a radio processor 101, a relay unit 103, a communication I/F unit 102, a MAC address processor 104, a MAC address notification unit 105, a MAC address storage 106, a MAC address determination unit 107, a data frame processor 108, and a data frame information storage 109.

The radio processor 101 transmits and receives radio signals. The radio processor 101 includes an LNA, a power amplifier, an up converter, a down converter, and the like. The communication I/F unit 102 is connected to the client PC 300 through the LAN 701A.

The relay unit 103 receives a data frame to be transmitted to the radio base station 200, and then relays the data frame to the radio base station 200. Moreover, the relay unit 103 receives a data frame to be transmitted to the client PC 300, and then relays the data frame to the client PC 300.

The MAC address processor 104 detects a frequently-appearing source MAC address on the basis of the source MAC address included in the data frame that the relay unit 103 receives. Instead of the above-described method, the method of detecting, as a frequently-appearing source MAC address, a source MAC address detected the number of times that is larger than a predetermined threshold value, may be employed.

The MAC address notification unit 105 notifies the radio base station 200 of the frequently-appearing source MAC address detected by the MAC address processor 104, through the radio processor 101.

Moreover, the MAC address processor 104 detects, as a frequently-appearing destination MAC address, the frequently-appearing source address given by the radio base station 200. The detected frequently-appearing source address and frequently-appearing destination address are stored in the MAC address storage 106.

The MAC address determination unit 107 determines whether or not the source MAC address included in a data frame to be transmitted to the radio base station 200 is identical to the frequently-appearing source MAC address stored in the MAC address storage 106.

If the MAC address determination unit 107 determines that the source MAC address included in the data frame to be transmitted to the radio base station 200 is identical to the frequently-appearing source MAC address stored in the MAC address storage 106, the data frame processor 108 omits transmission of the source MAC address, and sets a flag to indicate that the source MAC address is omitted (FASMA flag=1) in the data frame.

Moreover, the MAC address determination unit 107 determines whether or not the destination MAC address included in a data frame to be transmitted to the radio base station 200 and the frequently-appearing destination MAC address stored in the MAC address storage 106 are identical.

If the MAC address determination unit 107 determines that the destination MAC address included in the data frame to be transmitted to the radio base station 200 and the frequently-appearing destination MAC address stored in the MAC address storage 106 are identical, the data frame processor 108 omits transmission of the destination MAC address, and sets a flag to indicate that the destination MAC address is omitted (FADMA flag=1) in the data frame.

In the case of receiving a data frame from the radio base station 200, on the other hand, the data frame processor 108 can determine whether or not the destination MAC address and the source MAC address are omitted in the data frame, by checking the FASMA flag and the FADMA flag of the data frame.

It should be noted that the omission of the destination MAC address and the source MAC address in a data link header is more effective if the omission of other header fields is performed at the same time. For example, in a radio link, it is common to employ a mechanism to delete packets found to be inconsistent by calculation of a CRC or the like in a lower layer thereby delivering packets having no errors to the upper layers.

Specifically, in a data frame, a PCS field for detecting errors in a transmission path is omitted on the transmission side, and is then recalculated on the reception side, so that the transmission of the PCS field can be omitted. In addition, transmission of header fields with predetermined values can be omitted by complementing the fields on the reception side. The processing of omitting and complementing an FCS field and a field with a predetermine value are performed by the data frame processor 108.

The data frame information storage 109 stores therein information for identifying the format of a data frame (see FIG. 8).

(2.2) Configuration of Radio Base Station

Figure 4:
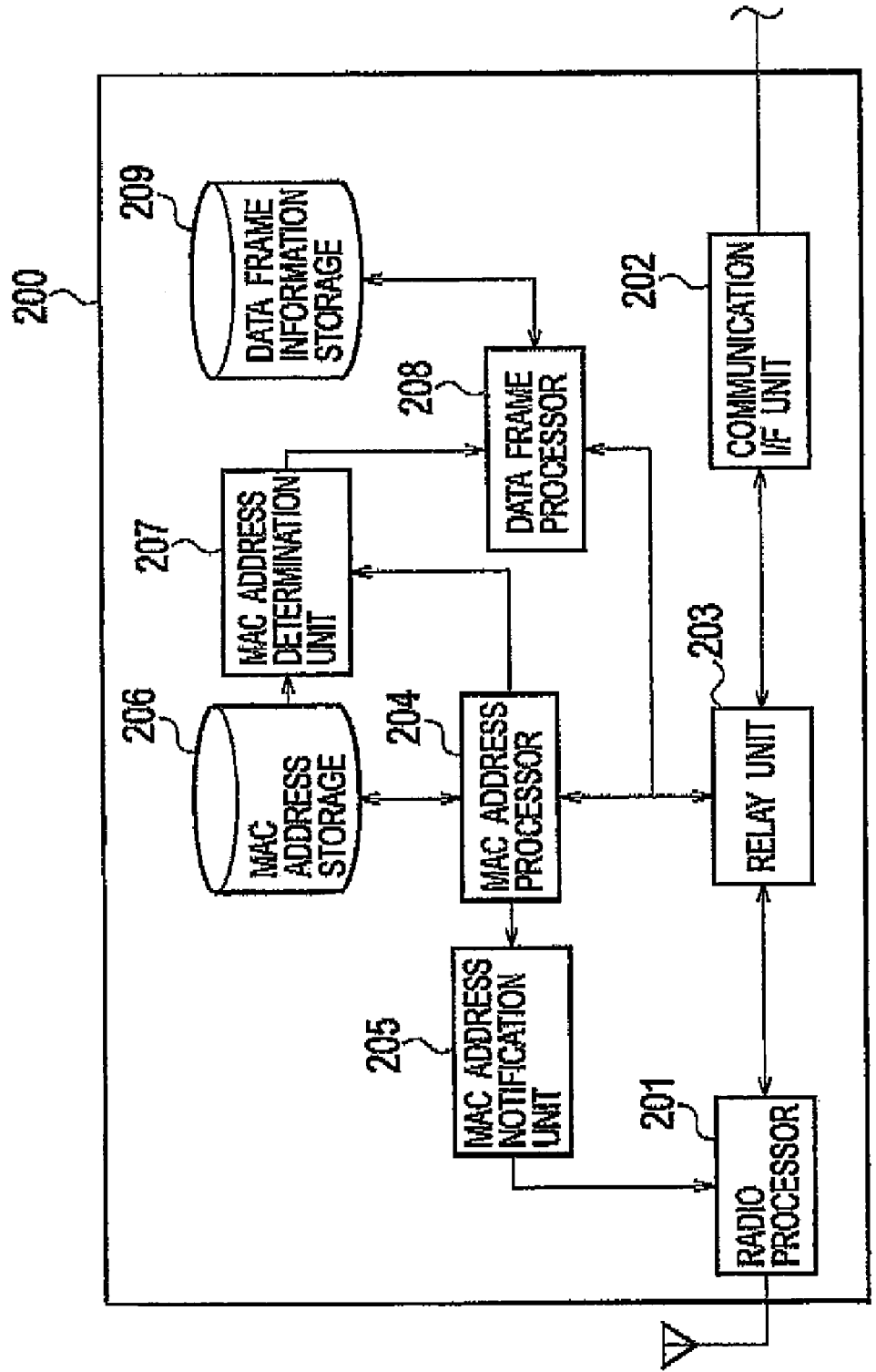
FIG. 4 is a functional block diagram of a radio base station according to the embodiment of the present invention.

FIG. 4 is a functional block diagram of the radio base station 200. As shown in FIG. 4, the radio base station 200 includes a radio processor 201, a communication I/F unit 202, a relay unit 203, a MAC address processor 204, a MAC address notification unit 205, a MAC address storage 206, a MAC address determination unit 207, a data frame processor 208, and a data frame information storage 209.

The communication I/F unit 202 is connected to the gateway 500 and the DHCP server 600 through the LAN 701B. Otherwise, the radio base station 200 has the same configuration as the radio communication terminal 100.

(3) Data Frame Configurations

Next, data frame configurations used in the radio communication system according to this embodiment will be described. FIGS. 5A to 5D are diagrams each showing a data frame configuration.

As shown in FIGS. 5A to 5D, four kinds of data frame formats can be used in the radio communication system according to this embodiment.

Figure 5A:
FIGS. 5A to 5D are diagrams each showing a data frame configuration used in the radio communication system according to the embodiment of the present invention.
Figure 5B:
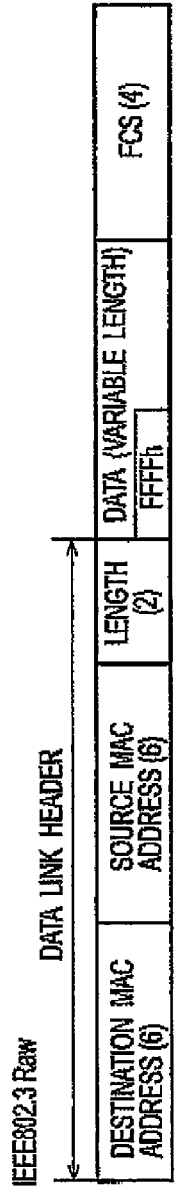

FIG. 5A shows an Ethernet II data frame, and FIG. 5B shows an IEEE 802.3 Raw data frame. The Ethernet II data frame and the IEEE 802.3 Raw data frame each include a data link header, data, and an FCS (Frame Check Sequence).

In each of the Ethernet II data frame and the IEEE 802.3 Raw data frame, the data link header and the FCS are to be compressed (omitted). Specifically, an LLC compressed header (see FIG. 6) is created on the basis of the data link header.

Figure 5C:
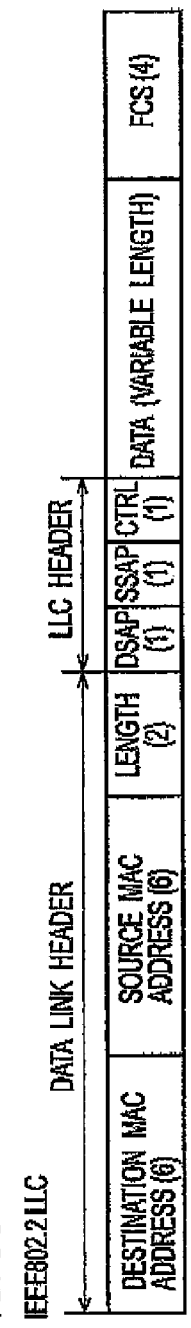

FIG. 5C shows an IEEE 802.2 LLC data frame. The IEEE 802.2, LLC data frame includes a data link header, an LLC header, data, and an FCS. In the IEEE 802.2 LLC data frame, the data link header, the LLC header, and the FCS are to be compressed (omitted). Specifically, an LLC compressed header is created on the basis of the data link header and the LLC header.

Figure 5D:
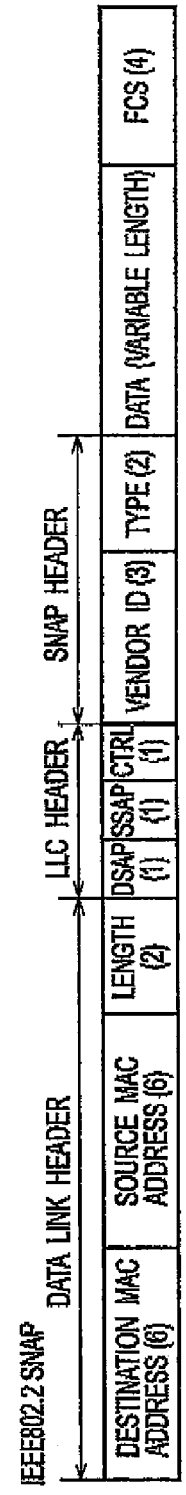

FIG. 5D shows an IEEE 802.2 SNAP data frame. The IEEE 802.2 LLC data frame includes a data link header, an LLC header, a SNAP header, data, and an PCS. In the IEEE 802.2 LLC data frame, the data link header, the LLC header, the SNAP header, and the FCS header are to be compressed (omitted). Specifically, an LLC compressed header is created on the basis of the data link header, the LLC header, and the SNAP header.

Hereinafter, a data string that is a data frame without a data link header is referred to as a "data link payload" where appropriate.

(4) Configuration of LLC Compressed Header

Next, a configuration of the LLC compressed header used in the radio communication system according to this embodiment will be described. FIG. 6 is a diagram showing the configuration of the LLC compressed header.

As shown in FIG. 6, the LLC compressed header includes a flag field, a destination MAC address field, a source MAC address field, a DSAP/SSAP field, a CTRL field, and a type field.

The flag field stores therein structure of flag indicating whether or not there are fields that follow.

The destination MAC address field stores therein the destination MAC address of the data link header.

The source MAC address field stores therein the source MAC address of the data link header.

The DSAP/SSAP field stores therein the DSAP and the SSAP included in the LLC header.

The CTRL field stores therein the CTRL included in the LLC header.

The type field stores therein the type included in the data link header or the type included in the SNAP header.

The fields included in the LLC compressed header respectively fill the corresponding fields of a data frame of any one of the above-described four kinds of data frame formats. Moreover, a negotiated value or a predetermined value fills a field the transmission of which is to be omitted. After all the fields except the FCS field are filled, the FCS is recalculated.

(5) Configuration of Flag Field

Next, a configuration of the flag field used in the radio communication system according to this embodiment will be described. FIG. 7 is a diagram showing the configuration of the flag field, and FIG. 8 shows relationships between flag patterns and data frame formats.

As shown in FIG. 7, the flag field includes a MSG flag, a BC flag, a FADMA flag, a FASMA flag, a RAW flag, a SNAP flag, a TYPE flag, and a RES flag.

The MSG flag is for indicating that the transmitted packet is a primitive message storing therein a frequently-appearing MAC address, or is an LLC compressed header frame. If the packet is an LLC compressed header frames the MSG flag is set to 0.

The BC flag is for indicating whether or not the destination MAC address is a broadcast address. If the destination MAC address consists of all FFh values, the BC flag is set to 1. In other words, when the BC flag is 1, no destination MAC address field is included in the LLC compressed header. If the BC flag is set to 1, the FADMA flag is set to 0.

The FADMA flag is for indicating whether or not the destination MAC address is omitted. If the destination MAC address and the frequently-appearing destination MAC address are identical to each other, the FADMA flag is set to 1. In other words, when the FADMA flag is 1, no destination MAC address field is included in the LLC compressed header. If the FADMA flag is set to 1, the BC flag is set to 0. When both the BC flag and the FADMA flag are 0, a destination MAC address field is included in the LLC compressed header.

The FASMA flag is for indicating whether or not the source MAC address is omitted. If the source MAC address and the frequently-appearing source MAC address are identical to each other, the FASMA flag is set to 1. In other words, when the FASMA flag is 1, no source MAC address field is included in the LLC compressed header. If the FASMA flag is 0, a source MAC address field is included in the LLC compressed header.

The RAW flag is set to 1 if both of the following conditions are satisfied:
The value of the type field in the data link header is 1500 or smaller; and
The first and second data values in the data link payload are both FFh.

When the RAW flag is 1, transmission of the first 2 bytes of the data link payload is omitted. When the RAW flag is 1, the SNAP flag and the TYPE flag are set to 0.

The SNAP flag is set to 1 if both of the following conditions are satisfied:
The value of the type field in the data link header is 1500 or to smaller; and
The first and second data values in the data link payload are both AAh.

When the SNAP flag is 1, transmission of the DSAP field, the SSAP field, and the CTRL field in the LLC compressed header, and the vendor ID field in the SNAP header is omitted. If the type field in the SNAP header has the value 0800 h indicating IP, transmission of the type field in the SNAP header is also omitted. When transmission of the type field in the SNAP header is omitted, the TYPE flag is set to be 0.

The TYPE flag is set to 1, if any of the following conditions is satisfied:
The value of the type field in the data link header is 1500 or smaller; or
The SNAP flag is 1, and the type field in the SNAP header is 0800 h indicating IP.

When the TYPE flag is 1, the type field in the data link head or the type field in the SNAP header is included in the LLC compressed header. When the SNAP flag is set to 1, and the TYPE flag is set to 0, transmission of the type field in the SNAP header is omitted. When the SNAP flag is 0, and the TYPE flag is 0, transmission of the type field in the data link header is omitted. The RES flag does not indicate anything special.

(6) Operation of Radio Communication System

Next, an operation of the radio communication system according to this embodiment will be described on the basis of (6.1) operation for exchanging frequently-appearing source MAC addresses, (6.2) operation of transmission-side radio communication apparatus, and (6.3) operation of reception-side radio communication apparatus, in this order. In each of the sections, description will be given of the operation in the case of transmitting a data frame from the radio communication terminal 100 to the radio base station 200.

(6.1) Operation for Exchanging Frequently-Appearing Source MAC Addresses

Figure 9:
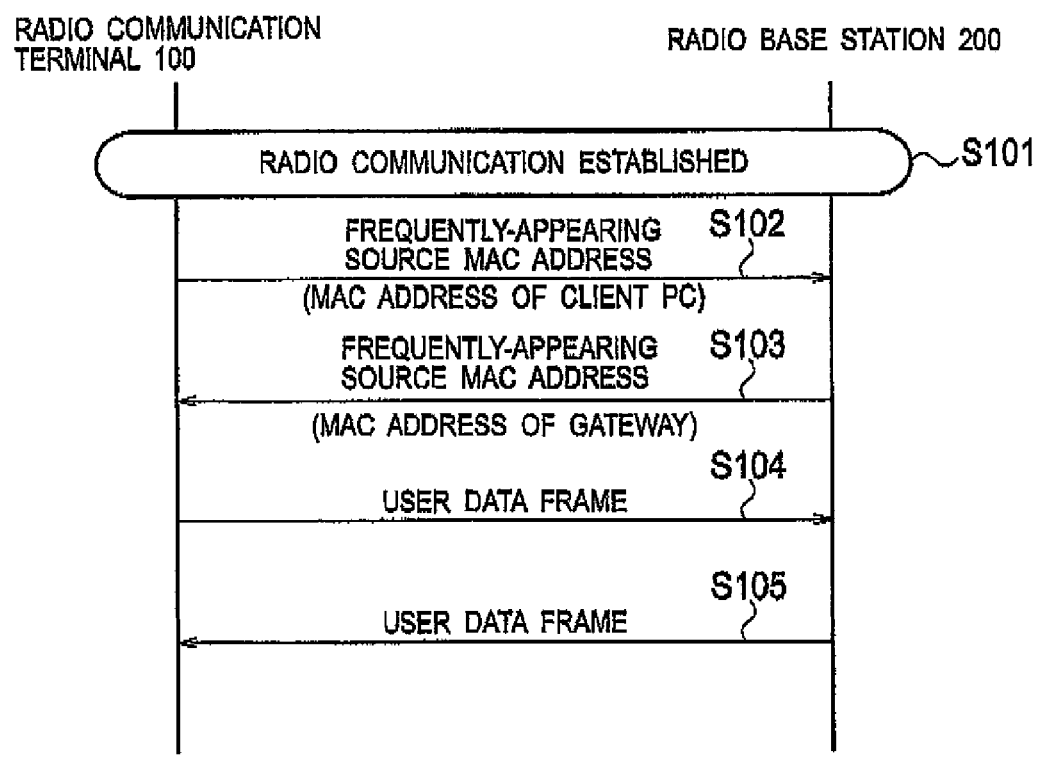
FIG. 9 is a sequence diagram showing an operation for exchanging frequently-appearing source addresses executed in the radio communication system according to the embodiment of the present invention.

FIG. 9 is a sequence diagram illustrating an operation for exchanging frequently-appearing source MAC addresses.

In Step S101, the radio communication terminal 100 and the radio base station 200 establish radio connection.

In Step S102, the radio communication terminal 100 notifies the radio base station 200 of a frequently-appearing source MAC address (the MAC address of the client PC 300 in this embodiment). The radio base station 200 stores therein the frequently-appearing source MAC address received from the radio communication terminal 100, as a frequently-appearing destination MAC address.

In Step S103, the radio base station 200 notifies the radio communication terminal 100 of a frequently-appearing source MAC address (the MAC address of the gateway 500 in this embodiment). The radio communication terminal 100 stores therein the frequently-appearing source MAC address received from the radio base station 200, as a frequently-appearing destination MAC address.

In Step S104, the radio communication terminal 100 transmits a data frame including user data to the radio base station 200. The data frame is compressed by using an LLC compressed header. The radio base station 200 reconstructs the original data frame by decompressing the LLC compressed header.

In Step S105, the radio base station 200 transmits a data frame including user data to the radio communication terminal 100. The data frame is compressed by using an LLC compressed header. The radio communication terminal 100 reconstructs the original data frame by decomposing the LLC compressed header.

FIG. 10 is a diagram illustrating a primitive message used in Step S102 and Step S103 shown in FIG. 9. As shown in FIG. 10, the primitive message stores therein frequently-appearing source MAC addresses. The MSG flag of the primitive message is set to 1.

(6.2) Operation of Transmission-Side Radio Communication Apparatus

Figure 11:
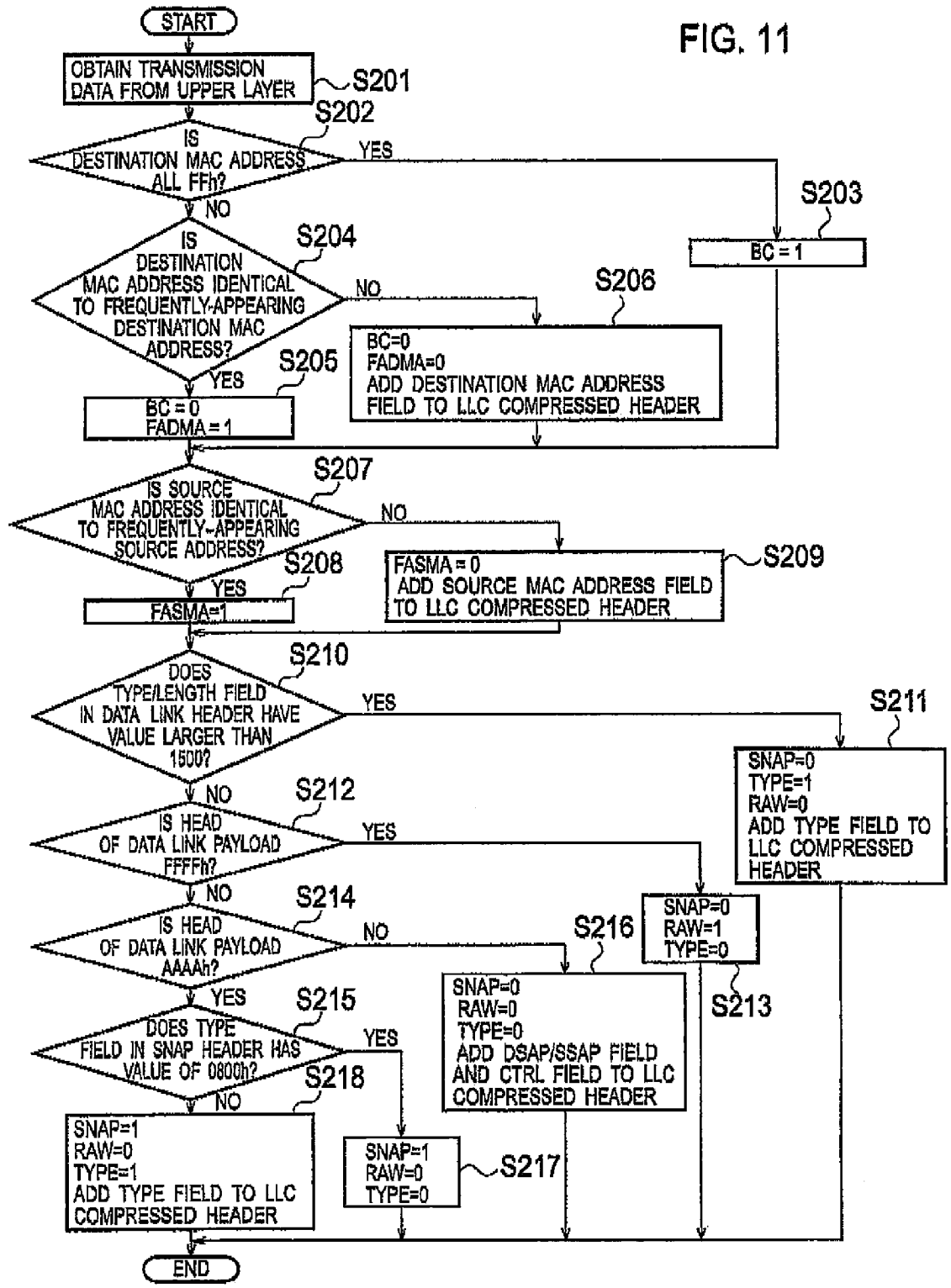
FIG. 11 is a flowchart illustrating an operation for creating the LLC compressed header in a transmission-side radio communication apparatus according to the embodiment of the present invention.

Next, operation of the radio communication terminal 100 will be described. FIG. 11 is a flowchart illustrating an operation for creating the LLC compressed header in the radio communication terminal 100.

(6.2.1) Operation for Omitting MAC Address

In Step S201, the radio communication terminal 100 obtains transmission data from an upper layer (the client PC 300).

In Step S202, the radio communication terminal 100 determines whether or not the destination MAC address consists of all FFh values, that is, whether or not the destination MAC address is a broadcast address. If the destination MAC address is a broadcast address, the process advances to Step S203. In Step S203, the radio communication terminal 100 sets the BC flag to 1. If the destination MAC address is not a broad cast address, the process advances to Step S204.

In Step S204, the radio communication terminal 100 determines whether or not the destination MAC address and the frequently-appearing MAC address are identical to each other. When the destination MAC address and the frequently-appearing destination MAC address are identical to each other, the process advances to Step S205. In Step S205, the radio communication terminal 100 sets the BC flag to 0, and also sets the FADMA flag to 1.

When the destination MAC address and the frequently-appearing destination MAC address are not identical, on the other hand, the process advances to Step S206. In Step S206, the radio communication terminal 100 sets the BC flag and the FADMA flag to 0, and also adds a destination MAC address field to the LLC compressed header.

In Step S207, the radio communication terminal 100 determines whether or not the source MAC address and the frequently-appearing source MAC address are identical to each other. When the source MAC address and the frequently-appearing source MAC address are identical to each other, the process advances to Step S208. In Step S208, the radio communication terminal 100 sets the FASMA flag to 1.

When the source MAC address and the frequently-appearing source MAC address are not identical, on the other hand, the process advances to Step S209. In Step S209, the radio communication terminal 100 sets the FASMA flag to 0, and also adds a source MAC address field to the LLC compressed header.

(6.2.2) Operation for Omitting Fields with Predetermined Values

Next, operation for omitting fields with a predetermined value will be described. Transmission of header fields each having a predetermined value can be omitted by complementing the fields on the reception side.

In Step S210, the radio communication terminal 100 determines whether or not the type or length field in the data link header has a value larger than 1500. When the type or length field in the data link header has a value larger than 1500, the process advances to Step S211. In Step S211, the radio communication terminal 100 sets the SNAP flag to 0, the TYPE flag to 1, and the RAW flag to 0. In addition, the radio communication terminal 100 adds a type (or length) field to the LLC compressed header. If the type or length field in the data link header has a value not larger than 1500, on the other hand, the process advances to Step S212.

In Step S212, the radio communication terminal 100 determines whether or not the head of the data link payload is FFFFh. When the head of the data link payload is FFFFh, the process advances to Step S213. In Step S213, the radio communication terminal 100 sets the SNAP flag to 0, the RAW flag to 1, and the TYPE flag to 0. When the head of the data link payload is not FFFFh, on the other hand, the process advances to Step S214.

In Step S214, the radio communication terminal 100 determines whether or not the head of the data link payload is AAAAh. When the head of the data link payload is AAAAh, the process advances to Step S215.

When the head of the data link payload is not AAAAh, on the other hand, the process advances to Step S216. In Step S216, the radio communication terminal 100 sets the SNAP flag to 0, the RAW flag to 0, and the TYPE flag to 0. In addition, the radio communication terminal 100 adds a DSAP/SSAP field and a CTRL field to the LLC compressed header.

In Step S215, the radio communication terminal 100 determines whether or not the type field in the SNAP header has a value of 0800 h. When the type field in the SNAP header is 0800 h, the process advances to Step S217. In Step S217, the radio communication terminal 100 sets the SNAP flag to 1, the RAW flag to 0, and the TYPE flag to 0.

When the type field in the SNAP header is not 0800 h, on the other hand, the process advances to Step S218. In Step S218, the radio communication terminal 100 sets the SNAP flag to 1, the RAW flag to 0, and the TYPE flag to 1. In addition, the radio communication terminal 100 adds a type field to the LLC compressed header.

(6.3) Operation of Reception-Side Radio Communication Apparatus

Figure 12:
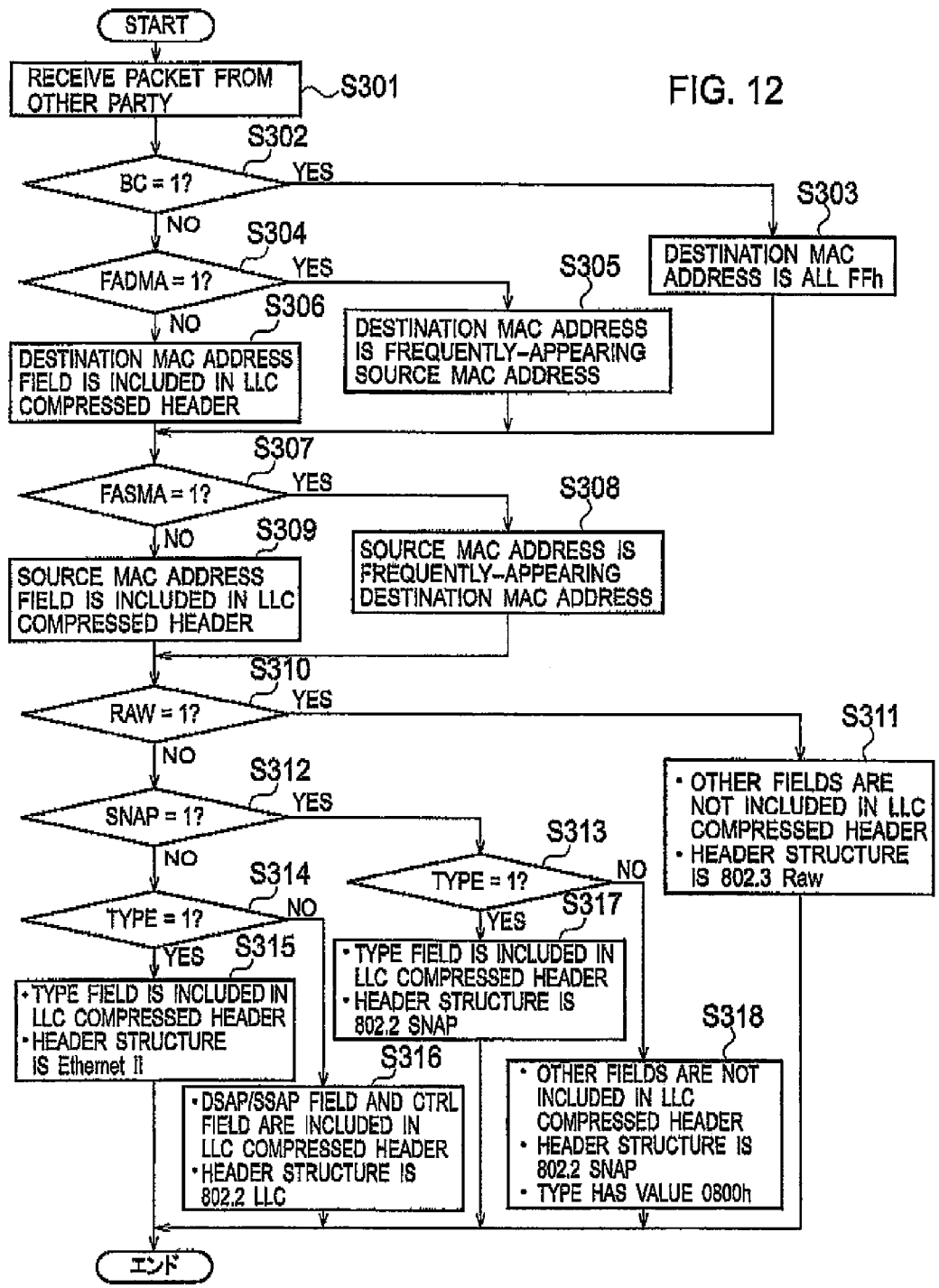
FIG. 12 is a flowchart illustrating an operation for reconstructing a data frame in a reception-side radio communication apparatus according to the embodiment of the present invention.

Next, operation of the radio base station 200 according to this embodiment will be described. FIG. 12 is a flowchart illustrating operation for estimating the structure of the LLC compressed header in the radio base station 200.

A method of analyzing an LLC compressed header performed by the reception-side apparatus (the radio base station 200 in this embodiment) will be described below. When receiving a data frame from the other party in the communication (the radio communication terminal 100 in this embodiment), the reception-side apparatus checks the MSG flag in the first octet to determine whether the received data frame is a primitive message or includes an LLC compressed header. When the data frame includes an LLC compressed header, a flag field is analyzed. By analyzing the flag field, the reception-side apparatus estimates the structure of the header before compression.

(6.3.1) Operation for Complementing MAC Address

In Step S301, the radio base station 200 receives a data frame from the radio communication terminal 100.

In Step S302, the radio base station 200 determines whether or not the BC flag in the flag field is 1. When the BC flag in the flag field is 1, the process advances to Step S303. In Step S303, the radio base station 200 determines that the destination MAC address consists of all FFh values (a broadcast address). When the BC flag in the flag field is 0, on the other hand, the process advances to Step S304.

In Step S304, the radio base station 200 determines whether or not the FADMA flag in the flag field is 1. When the FADMA flag in the flag field is 1, the process advances to Step S305. In Step S305, the radio base station 200 determines that the destination MAC address is identical to the frequently-appearing source MAC address.

When the FADMA flag in the flag field is 0, the process advances to Step S306. In Step S306, the radio base station 200 determines that the destination MAC address is included in the LLC compressed header.

In Step S307, the radio base station 200 determines whether or not the FASMA flag in the flag field is 1. When the FASMA flag in the flag field is 1, the process advances to Step S308. In Step S308, the radio base station 200 determines that the source MAC address is identical to the frequently-appearing destination MAC address.

When the FASMA flag in the flag field is 0, the process advances to Step S309. In Step S309, the radio base station 200 determines that the source MAC address is included in the LLC compressed header.

(6.3.2) Operation for Complementing Fields with Predetermined Value

Next, operation for complementing fields each with a predetermined value will be described. Since transmission of the header fields each having a predetermined value is omitted, the fields not transmitted need to be complemented on the reception side.

In Step S310, the radio base station 200 determines whether or not the RAW flag in the flag field is 1. When the RAW flag in the flag field is 1, the process advances to Step S311. In Step S311, the radio base station 200 determines that other fields (a DSAP/SSAP field, a CTRL field and a type field) are not included in the LLC compressed header.

In Step S312, the radio base station 200 determines whether or not the SNAP flag in the flag field is 1. When the SNAP flag in the flag field is 1, the process advances to Step S313. When the SNAP flag in the flag field is 0, the process advances to Step S314.

In Step S313, the radio base station 200 determines whether or not the TYPE flag in the flag field is 1. When the TYPE flag in the flag field is 1, the process advances to Step S317. In Step S317, the radio base station 200 determines that a type field is included in the LLC compressed header. Moreover, the radio base station 200 determines that the data frame has the header structure of the 802.2 SNAP data frame.

When the TYPE flag in the flag field is 0, the process advances to Step S318. In Step S318, the radio base station 200 determines that other fields (a DSAP/SSAP field, a CTRL field and a type field) are not included in the LLC compressed header. Moreover, the radio base station 200 determines that the data frame has the header structure of the 802.2 SNAP data frame, and that the type field has the value 0800 h.

In step S314, the radio base station 200 determines whether or not the TYPE flag in the flag field is 1. When the TYPE flag in the flag field is 1, the process advances to Step S315. In Step S315, the radio base station 200 determines that a type field is included in the LLC compressed header. Moreover, the radio base station 200 determines that the data frame has the header structure of the Ethernet II data frame.

When the TYPE flag in the flag field is 0, the process advances to Step S316. In Step S316, the radio base station 200 determines that a DSAP/SSAP field and a CTRL field are included in the LLC compressed header. Moreover, the radio base station 200 determines that the data frame has the header structure of the 802.2 LLC data frame.

(7) Comparative Example

Next, the effects to be brought about by this embodiment will be described with reference to a comparative example.

Figure 13:
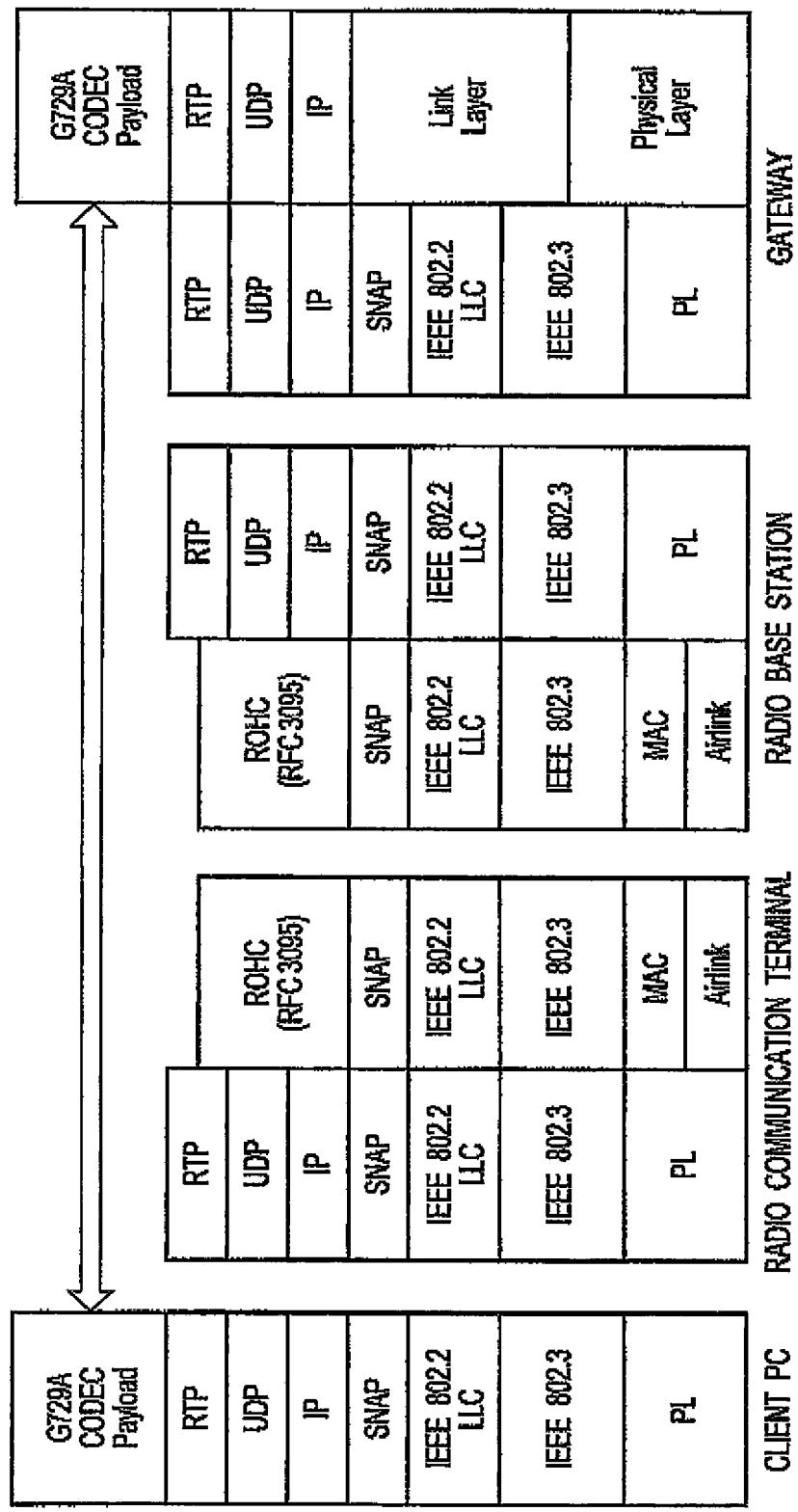
FIG. 13 is a diagram showing a protocol stack of a radio communication system of a comparative example of the present invention.

FIG. 13 is a diagram showing the protocol stack of a radio communication system according to this comparative example.

In FIG. 13, no changes have been made to the IEEE 802.2 LLC/IEEE 802.3 protocol headers. Accordingly, when the IEEE 802.2 SNAP data frame shown in FIG. 5D is employed, the over head is a total of 26 bytes, consisting of 5 bytes used by the SNAP header, 3 bytes used by the IEEE 802.2 LLC header, 14 bytes used by the data link header, and 4 bytes used by the FCS.

In the voice communication based on IP-based VoIP using G729A (8 Kbps), a RTP/UDP/IP packet including two codec payloads is generated every 20 msec. If the RTP/UDP/IP packet header is compressed to approximately 2 bytes by means of ROHC compression, the total size of the RTP/UDP/IP packet is reduced only to a total of 22 bytes, consisting of 20 bytes used for the two codec payloads and 2 bytes used for the ROHC header. If overhead of 26 bytes is generated for delivering an IP-based voice packet, the size of the overhead is more than twice the size of the data to be delivered.

By contrast, in the above-described embodiment, an IEEE802.2 LLC/IEEE 802.3 header, ideally consisting of 26 bytes, is compressed to an LLC compressed header consisting of 1 octet. In the case of delivering two codec payloads in a single IP packet by employing G729A (8 Kbps) as a codec, such an IP packet is generated once in every 20 msec. Accordingly, throughput can be increased by $(26-1)*8*(1/0.02)=10000$ (bps).

In terms of the destination MAC address and the source MAC address included in the data link header, the fields of a total of 12 octets are compressed to a flag string of 3 bits. By assuming that 1 octet is required for representing a flag string, throughput is increased by $(12-1)* 8*(1/0.02)=4400$ (bps).

(8) Effects and Advantages

According to the above-described embodiment, the radio communication terminal 100 notifies the radio base station 200 of the MAC address of the client PC 300 as a frequently-appearing source MAC address. Moreover, if the source MAC address of the data frame to be transmitted to the radio base station 200 is identical to the frequently-appearing source MAC address, the radio communication terminal 100 omits transmission of the source MAC address of the data frame, and also sets the FASMA flag, indicating that the source MAC address is omitted, to 1.

If the FASMA flag of the received data frame is 1, the radio base station 200 identifies the source device of the data frame by using the received frequently-appearing source MAC address. Accordingly, the radio communication terminal 100 can omit transmission of the source MAC address.

In addition, the radio communication terminal 100 omits transmission of the destination MAC address of the data frame by using the MAC address of the gateway as the frequently-appearing destination MAC address.

Accordingly, by reducing the overhead of the communication between the radio communication terminal 100 and the radio base station 200, a transmission path suitable for real-time communication such as VoIP can be provided in a transmission system, such as radio communication, using a narrow bandwidth.

Moreover, the radio communication terminal 100 can improve the throughput of user data transmission by transmitting user data addressed to the gate way 500 instead of the source MAC address and the destination MAC address.

Furthermore, the radio communication terminal 100 can notify the radio base station 200 of the frequently-appearing source MAC address based on the actual state of usage by notifying the radio base station 200 of the source MAC address detected the number of times that is larger than a predetermined threshold value, as a frequently-appearing source MAC address. Thereby, the frequently-appearing source MAC address can be efficiently omitted, and the radio communication terminal 100 transmits user data addressed to the gateway 500 instead of the source MAC address. Hence, the throughput of user data transmission can be improved.

Moreover, the radio communication terminal 100 determines whether or not the destination MAC address of the data frame to be transmitted to the radio base station 200 is a broadcast address. When the destination MAC address is a broadcast address, the radio communication terminal 100 omits transmission of the destination MAC address, and also sets the BC flag to 1. With this configuration, even if the destination MAC address is a broadcast address, it is possible to omit the destination MAC address. By transmitting user data addressed to the gateway 500 instead of the broadcast address, the throughput of user data transmission can be improved.

Other Embodiments

The present invention has been disclosed hereinabove on the basis of an embodiment of the present invention. However, it should not be understood that the description and the drawings forming part of the disclosure are intended to limit the present invention. From this disclosure, various alternative embodiments will be apparent to those skilled in the art.

For example, in the above-described embodiment, a single frequently-appearing destination address and a single frequently-appearing source address are used for each apparatus. However, multiple frequently-appearing destination addresses and multiple frequently-appearing source addresses may be used, instead. In such a case, it is possible to distinguish multiple frequently-appearing destination MAC addresses from each other and multiple frequently-appearing source MAC addresses from each other, by increasing the number of bits for each of the FADMA flag and the FASMA flag.

Moreover, in the above-described embodiment, the radio base station 200 and the gateway 500 are individually provided. However, configuration can be employed so that the radio base station 200 can include the function of the gateway 500.

Furthermore, in the above-described embodiment, the operation performed in the case of transmitting a data frame from the radio communication terminal 100 to the radio base station 200 has been described. However, the same operation as that described above is performed also in the case of transmitting a data frame from the radio base station 200 to the radio communication terminal 100.

Thus, it is obvious that the present invention includes various embodiments not described herein. Hence, the technical scope of the present invention is only defined by the features of the present invention according to the scope of the patent claims based on the above description.

What is claimed is:

1. A radio communication system comprising:
a transmission-side radio communication apparatus; and
a reception-side radio communication apparatus configured to perform radio communication with the transmission-side radio communication apparatus, wherein
the transmission-side radio communication apparatus includes:
a relay unit configured to receive a first data frame to be transmitted to the reception-side radio communication apparatus, and to then relay the first data frame to the reception-side radio communication apparatus;
an address detector configured to detect a first source address, which is included in the first data frame received by the relay unit, and which is permanently assigned to a source device of the first data frame;
a source address information notification unit configured to notify the reception-side radio communication apparatus of omitted-source-address information indicating the first source address detected by the address detector;
a determination unit configured to determine whether or not the first source address, of which the source address information notification unit notifies the reception-side radio communication apparatus, is identical to a second source address included in a second data frame received by the relay unit, and permanently assigned to a source device of the second data frame; and
a data structure change unit configured to change the structure of the second data frame if the determination unit determines that the first source address is identical to the second source address,
wherein the data structure change unit omits transmission of the second source address included in the second data frame, and also adds, to the second data frame, an omission indication indicating that the second source address is omitted, and
the reception-side radio communication apparatus includes:
a receiver configured to receive the first data frame, the omitted-source-address information and the second data frame from the transmission-side radio communication apparatus; and
a device identification unit configured to identify the source device of the second data frame on the basis of the omitted-source-address information received by the receiver, if the omission indication is added to the second data frame received by the receiver.

2. A radio communication apparatus configured to perform radio communication with a reception-side radio communication apparatus, the radio communication apparatus comprising:
a relay unit configured to receive a first data frame to be transmitted to the reception-side radio communication apparatus, and to then relay the first data frame to the reception-side radio communication apparatus;
an address detector configured to detect a first source address, which is included in the first data frame received by the relay unit, and which is permanently assigned to a source device of the first data frame;
a source address information notification unit configured to notify the reception-side radio communication apparatus of omitted-source-address information indicating the first source address detected by the address detector;
a determination unit configured to determine whether or not the first source address, of which the source address information notification unit notifies the reception-side radio communication apparatus, is identical to a second source address included in a second data frame received by the relay unit, and being permanently assigned to a source device of the second data frame; and
a data structure change unit configured to change the structure of the second data frame if the determination unit determines that the first source address is identical to the second source address, wherein the data structure change unit omits transmission of the second source address included in the second data frame, and also adds, to the second data frame, an omission indication indicating that the second source address is omitted.

3. The radio communication apparatus according to claim 2, further comprising an address information receiver configured to receive, from the reception-side radio communication apparatus, omitted-destination-address information indicating a destination address assigned to a certain destination device, wherein
the second data frame includes a destination address permanently assigned to a destination device of the second data frame,
the data structure change unit omits transmission of the destination address of the second data frame, in addition to the second source address, on the basis of the omitted-destination-address information received by the address information receiver, and
the destination address assigned to the certain destination device is identical to the designation address permanently assigned to the destination device of the second data frame.

4. The radio communication apparatus according to claim 3, wherein the data structure change unit transmits user data addressed to the destination device of the second data frame, instead of transmitting the destination address permanently assigned to the destination device of the second data frame.

5. The radio communication apparatus according to claim 2, wherein
the determination unit determines whether or not the second data frame is to be broadcast to a plurality of destination devices, and
if the determination unit determines that the second data frame is broadcast to the plurality of destination devices, the data structure change unit omits transmission of a destination address which is included in the second data frame, and which is indicating broadcast.

6. The radio communication apparatus according to claim 2, wherein the data structure change unit transmits user data addressed to a destination device of the second data frame, instead of transmitting the second source address.

7. The radio communication apparatus according to claim 2, wherein the source address information unit transmits, to the reception-side radio communication apparatus, the first source address that is detected, by the address detector, the number of times that is larger than a predetermined threshold value, as the omitted-source-address information.

8. A radio communication apparatus configured to perform radio communication with a transmission-side radio communication apparatus, the radio communication apparatus comprising:
a receiver configured to receive a first data frame; omitted-source-address information and a second data frame from the transmission-side radio communication apparatus;
a transmitter configured to transmit a third data frame received from a certain destination device to the transmission-side radio communication apparatus; and
a device identification unit configured to identify a source device of the second data frame on the basis of the omitted-source-address information received by the receiver if an omission indication is added to the second data frame received by the receiver; and
a destination address information notification unit configured to notify the transmission-side radio communication apparatus of omitted-destination-address information indicating a destination address assigned to the certain destination device, wherein
the first data frame and the second data frame are relayed by the transmission-side radio communication apparatus,
the omitted-source-address information indicates a first source address, which is permanently assigned to a source device of the first data frame,
the first source address is included in the first data frame,
the omission indication is included in the second data frame, and indicates that a second source address permanently assigned to the source device of the second data frame is omitted, and
the second data frame includes a destination address permanently assigned to a destination device of the second data frame.

9. A radio communication method using a transmission-side radio communication apparatus and a reception-side radio communication apparatus configured to perform radio communication with the transmission-side radio communication apparatus, the radio communication method comprising the steps of:
notifying, at the transmission-side radio communication apparatus, the reception-side radio communication apparatus of omitted-source-address information indicating a first source address permanently assigned to a source device of a first data frame to be transmitted to the reception-side radio communication apparatus;
determining, at the transmission-side radio communication apparatus, whether or not the first source address is identical to a second source address permanently assigned to a source device of a second data frame to be transmitted to the reception-side radio communication apparatus;
transmitting, at the transmission-side radio communication apparatus, the second data frame to the reception-side radio communication apparatus after omitting transmission of the second source address included in the second data frame and also adding, to the second data frame, an omission indication indicating that the second source address is omitted, if the first source address is determined to be identical to the second source address in the step of determining;
receiving, at the reception-side radio communication apparatus, the first data frame, the omitted-source-address information and the second data frame from the transmission-side radio communication apparatus;
identifying, at the reception-side radio communication apparatus, the source device of the second data frame on the basis of the received omitted source-address information, if the omission indication is added to the second data frame received in the step of receiving; and
transmitting, at the reception-side radio communication apparatus, a third data frame received from a certain destination device to the transmission-side radio communication apparatus;
notifying, at the reception-side radio communication apparatus, the transmission-side radio communication apparatus of omitted-destination-address information indicating a destination address assigned to the certain destination device, wherein
the second data frame includes a destination address permanently assigned to a destination device of the second data frame.

* * * * *